Feb. 23, 1954 J. A. ROSSITER 2,670,056
MULTIPLE UNIT GAS-OIL SEPARATOR AND GAS CLEANER
Filed June 12, 1950 4 Sheets-Sheet 1

INVENTOR.
JAY A. ROSSITER
BY Lester B. Clark
   Ray L. Smith
       ATTORNEYS.

Feb. 23, 1954     J. A. ROSSITER     2,670,056
MULTIPLE UNIT GAS-OIL SEPARATOR AND GAS CLEANER
Filed June 12, 1950     4 Sheets—Sheet 2

INVENTOR.
JAY A. ROSSITER
BY Lester B. Clark
   Ray L. Smith
ATTORNEYS.

Feb. 23, 1954      J. A. ROSSITER      2,670,056
MULTIPLE UNIT GAS-OIL SEPARATOR AND GAS CLEANER
Filed June 12, 1950      4 Sheets-Sheet 3
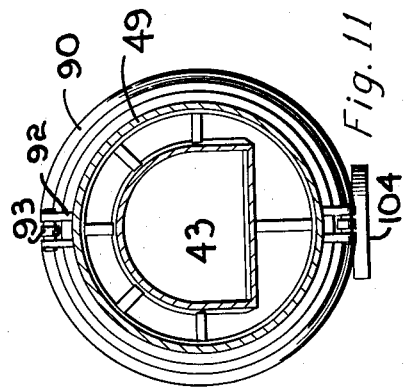
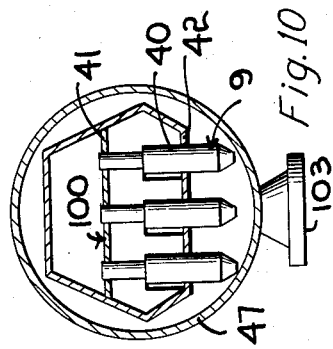
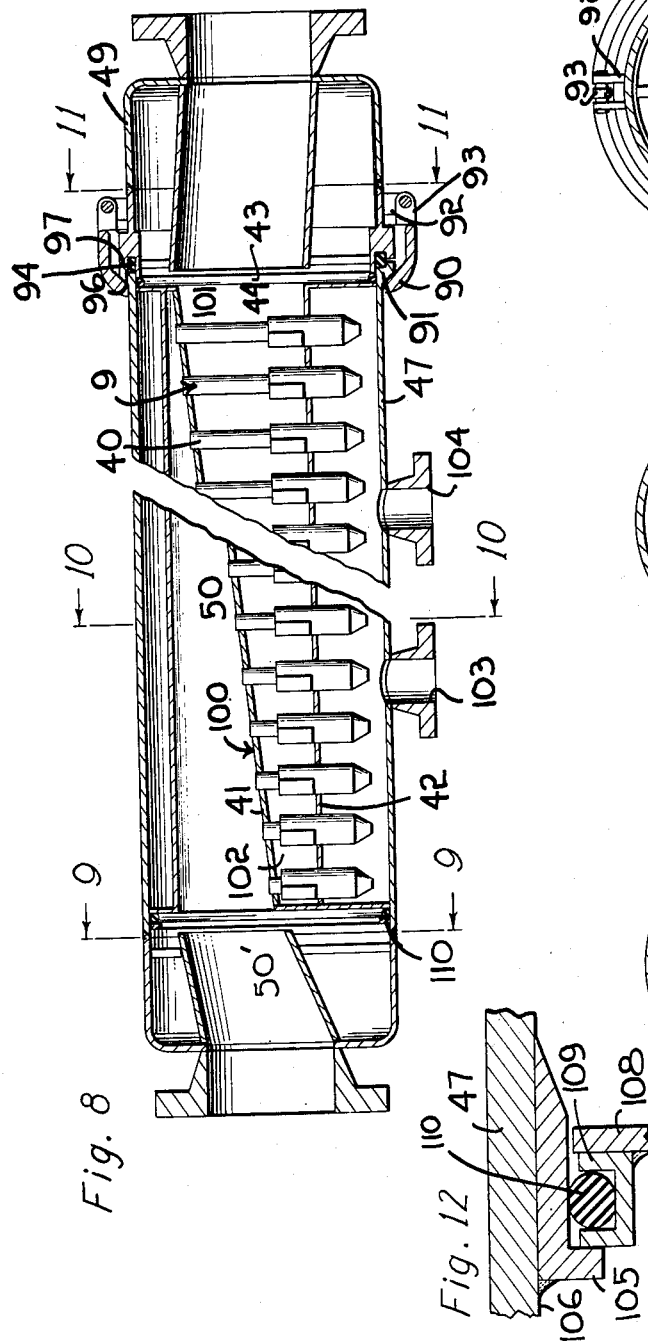
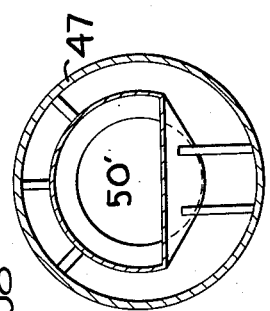
JAY A. ROSSITER
INVENTOR.
BY Lester B. Clark
& Ray L. Smith
ATTORNEYS Feb. 23, 1954 J. A. ROSSITER 2,670,056
MULTIPLE UNIT GAS-OIL SEPARATOR AND GAS CLEANER
Filed June 12, 1950 4 Sheets-Sheet 4
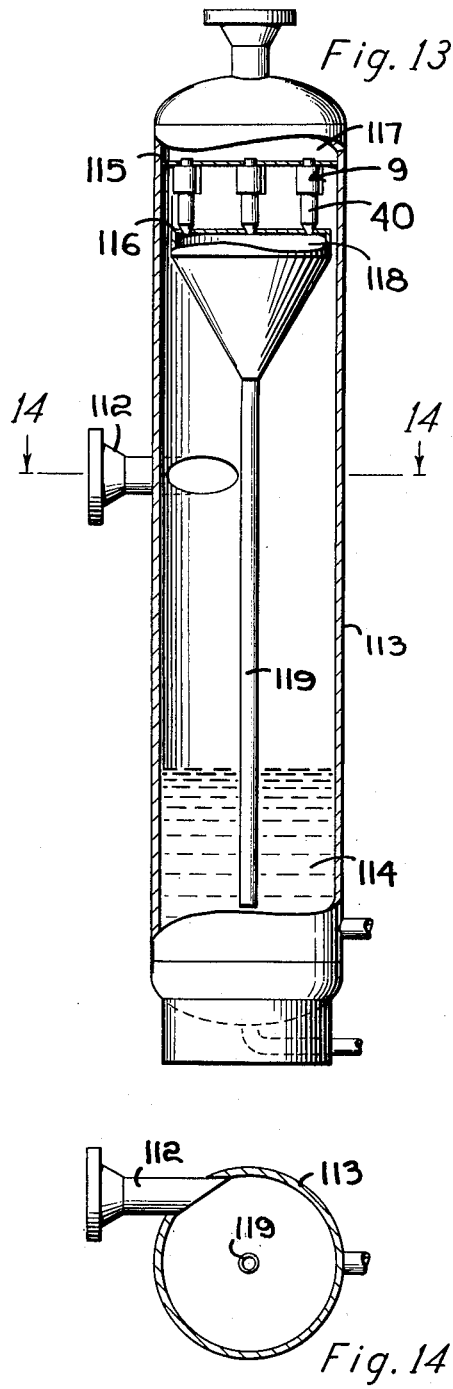
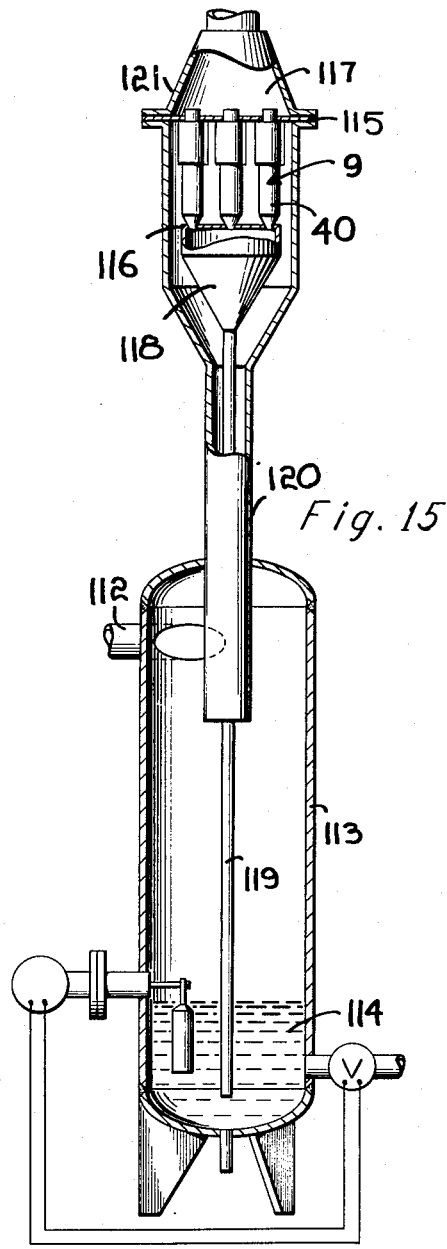
JAY A. ROSSITER
INVENTOR.
BY Lester B. Clark
Ray L. Smith
ATTORNEYS Patented Feb. 23, 1954

2,670,056

UNITED STATES PATENT OFFICE 2,670,056

MULTIPLE UNIT GAS-OIL SEPARATOR AND
GAS CLEANER

Jay A. Rossiter, Houston, Tex.

Application June 12, 1950, Serial No. 167,680

10 Claims. (Cl. 183—83)

1

The invention relates to a removable unit gas-oil separator and a gas cleaner.

This application is a continuation in part of my prior copending application, Serial Number 687,807, for a Multiple Unit Gas-Oil Separator and Gas Cleaner, filed August 2, 1946, and now abandoned. This application is entitled to the benefit of the filing date of August 2, 1946 as to all common subject matter of said above mentioned copending application.

Under various sets of circumstances, it is necessary to remove foreign matter in both liquid and solid form from a gaseous fluid. The present invention directs itself to a simple and economical set of equipment which can be varied in size to accommodate the volume to be treated and wherein the parts which are subjected to wear may be readily replaced.

It is one of the objects of the invention to provide a bank of centrifugal separator units to effect the removal of liquid and solids from a gaseous fluid.

Still another object of this invention is to provide a system of treating gas which is contaminated with liquids and/or solids so as to first separate the gas and to thereafter separate the liquids and solids so as to effect recovery of the various materials.

Still another object of the invention is to provide a separate assembly made up of one or more individual units so that the proper number of units may be used to obtain the total capacity and each unit in turn being capable of having the parts which are subject to wear easily replaced without interfering with the operation of the remaining units, this replacement being possible at a relatively small cost.

Still another object of the invention is to provide an equalizing pipe between the gaseous separating unit and the liquid separating unit in a system of cleaning gas so as to permit the cutting out of any one of a plurality of gas cleaner units and to allow the foreign matter removed by such gas cleaner units to flow by gravity therefrom.

Still another object of the invention is to provide a removable nest of small centrifugal tubes for use in gas cleaning units so as to compensate for wear and corrosion.

A still further object of the invention is to provide in a separator including a bank of centrifugal separator units to effect the removal of liquids and solids from a gaseous fluid, a means to balance the volume of flow through each unit in the bank.

Yet a further object of the invention is to provide a separator including a bank of centrifugal separator units to effect the removal of liquids and solids from gaseous fluids where the gaseous fluids contain a relatively high percentage of liquids.

A still further object of the invention is to provide a separator including a bank of cen-

2 trifugal separator units to effect the removal of liquids and solids from gaseous fluids where the amount of gaseous fluids is small compared to the amount of liquids.

Still another object of the invention is to provide an oil-gas separator for oil well, such separator including a bank of centrifugal separator units.

Other and further objects of the invention will be readily apparent when the following description is considered in connection with the accompanying drawings wherein:

Fig. 8 is a transverse section of a modified form of a gas cleaner unit arranged to accommodate a horizontal flow of gas being cleaned.

Fig. 9 is a section taken on the line 9—9 of Fig. 8 and illustrates the discharge outlet from the gas cleaner unit.

Fig. 10 is a section taken on the line 10—10 of Fig. 8 and illustrates an arrangement of the tube nest of the modified construction.

Fig. 11 is a section taken on the line 11—11 of Fig. 8 and shows the inlet opening into the gas cleaner unit.

Fig. 12 is an enlarged detail illustrating a form of the packing used in the construction.

Fig. 13 is a side elevation, partly in section, illustrating an alternate embodiment of the invention.

Fig. 14 is a section taken on the line 14—14 of Fig. 13.

Fig. 15 is a side elevation partly in section illustrating another modification of the invention.

Figure 1:
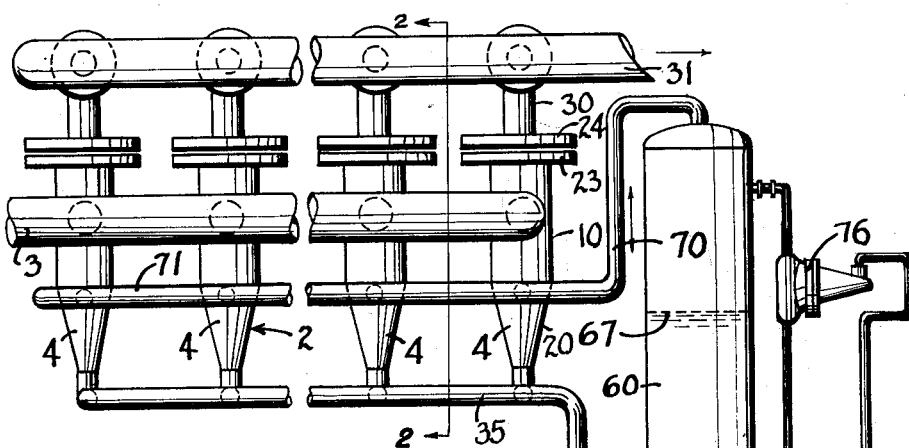
Fig. 1 is a side elevation of the equipment arranged in operating position with some of the parts in section.

In Fig. 1 the bank of cleaner units is illustrated generally at 2 as shown four such units arranged in parallel an inlet pipe or manifold 3 extends along the side of the individual units 4 and has a lateral connection 5 through a valve 6 into the inlet 7 of each of the units 4.

Figure 3:
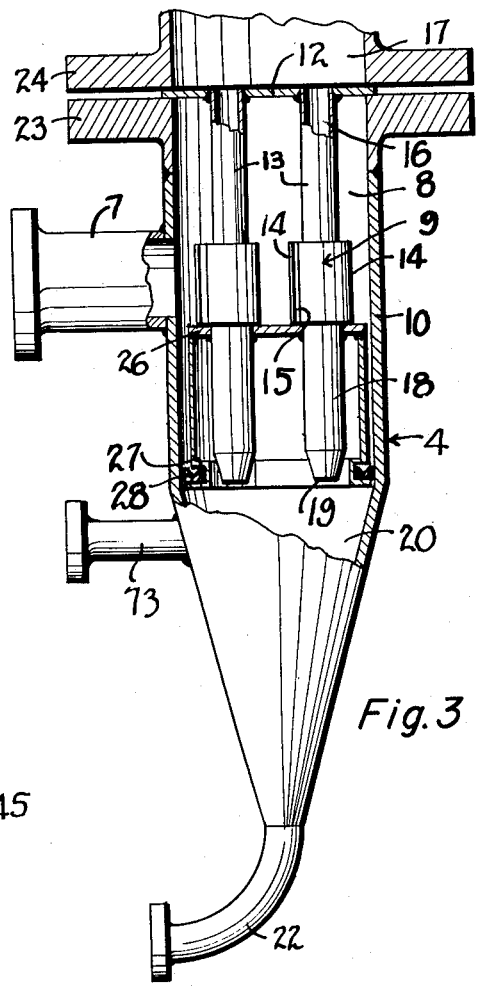
Fig. 3 is a side elevation of one of the gas cleaner units and showing the interior arrangement of the tube nest in section.
Figure 7:
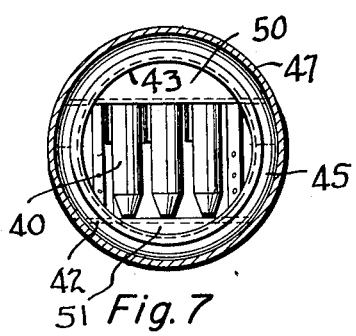
Fig. 7 is a section taken on the line 7—7 of Fig. 6 and illustrating the arrangement of seating of the tube nest in the cleaner shell.

Fig. 3 shows this inlet 7 as discharging into the annular chamber 8 which contains the tube nest 9 within the shell 10 of the unit 4.

This tube nest is made up of a flange 12 to which a plurality of pipes 13 have been affixed. Each of these pipes is shown as having a pair of outstanding wings or baffles 14 thereon which provide an inlet or openings 15 to the interior of the tube. Tubes having only one inlet may be used. In this manner the incoming gas is caused to flow in a circular path as it enters each tube so that the centrifugal force will cause any heavier liquids or solids to move outwardly against the internal surface 16 of the tube 13. In this manner the gas will rise and pass into the outlet conduit 17 from the unit while the heavier materials will move by gravity into the lower portion of the tubes and discharge therefrom at 19 into the base portion 20 of the unit. In this manner a separation of the gas from the liquids and solids is effected and the liquids and solids comingled will move into the outlet 22 at the base of the unit 4.

Particular attention is directed to the form of the tube nest 9 in that the circular flange 12 is confined by the upper end 23 of the unit 4 and the outlet flange 24 so that it is firmly positioned. The tubes 13 which may be provided in any desired number, depending upon the size of the unit, are then affixed to this plate or flange 12. Below the inlet's baffles 14 a cross plate 26 serves to seal the lower portion 18 of the tubes away from the incoming material. In order to seal this incoming material from the base 20, the tube nest has been provided with a flange 27 which carries a lip-type O ring or any other suitable resilient packing 28. Such packing forms a seal as a function of the applied pressure.

This arrangement is of particular advantage because the tubes 13 constitute the portion of the unit which is subjected to wear and corrosion and requires replacement. Replacement may be readily effected by merely removing the outlet flange 24 and elbow 30 and replacing the tube nest.

Figure 2:
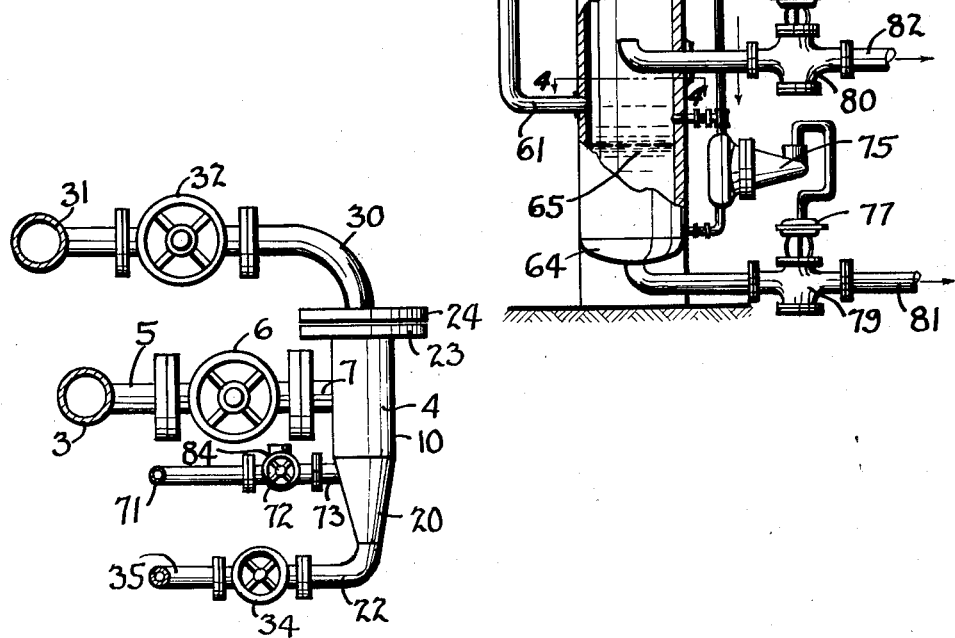
Fig. 2 is a transverse section taken on the line 2—2 of Fig. 1 and showing the gas cleaner unit with inlet, outlet, equalizing and drain manifolds or pipes connected thereto.

Fig. 2 illustrates this arrangement where the flange 24 is a portion of the elbow 30 which can be readily removed in the replacing of the tube nest.

The closing of the valve 6, of course, shuts off the inlet of materials to the unit when the unit is to be cut out of service for inspection or replacement.

In order to dispose of the cleaned gas, an outlet manifold 31 is connected to all of the outlet pipes 30 by means of a control valve 32. All of the units 4 discharge into this same manifold 31.

The elbow or outlet pipe 22 is connected by a valve 34 to the outlet manifold 35 which is also connected to all of the cleaner units.

With the foregoing arrangement, it seems obvious that a simple and economical cleaner has been provided which can be varied in capacity by using the proper number of units.

Figure 6:
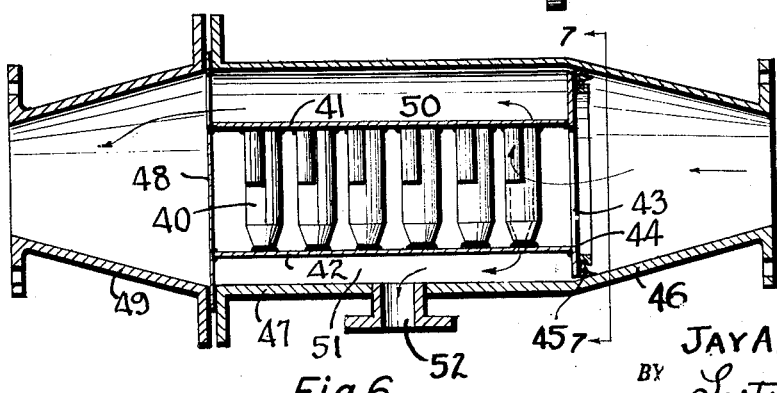
Fig. 6 is a transverse section of a gas cleaner unit arranged to accommodate a horizontal flow of gas being cleaned.

Fig. 6 shows a slightly modified form of the tube nest 9 wherein the tubes 40 are mounted between the plates 41 and 42 with the inlet of material passing through an opening 43 in the end 44 of the tube nest. The lip packing 45 is of slightly different form than that shown in Fig. 3 but is arranged to form a seal with the conical portion 46 of the shell or housing 47.

The support plate 48 of the tube nest is confined between the end of the shell 47 and the connecting nipple 49. The removal of this nipple 49 permits replacement of the tube nest. The cleaned gas moves upwardly into the passage 50 above the tube nest as is seen in Fig. 6 while the liquids and solids move into the chamber 51 below the tube nest and discharge from the outlet 52 in the shell 47.

Figure 4:
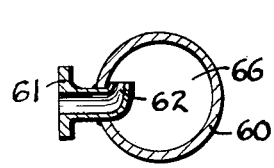
Fig. 4 is a transverse section of the separator of Fig. 1 and illustrating the mode of introducing the separated liquids and solids into the separator tank with a gyratory motion.
Figure 5:
Fig. 5 is a transverse section of the modified form of the inlet of Fig. 4.

In order to provide an equipment and a system to effect the complete separation of the materials being treated, the bank of gas cleaner units will be augmented by a separator tank 60 best seen in Fig. 1. This tank may be of any desired shape or construction such as a vertical or as horizontally inclined cylinder having no obstructions whatsoever therein but having the outlet manifold 35 connected thereto in the form of a pipe 61. This pipe 61 preferably has a discharge head 62 thereon as best seen in Fig. 4 so as to discharge the material into the tank 60 with a gyratory or centrifugal movement. This is desirable so as to effect further separation of the solids or heavier liquids from the lighter liquids. This inlet pipe 61 is spaced a suitable distance above the base 64 of the tank so as to allow for an accumulation of solids and water as seen at 65 in the base of the tank while any distillate or casing-head gas will accumulate in the area 66 in the central portion of the tank. The distillate level will preferably be maintained at 67 so that there will be a gravity flow from the cleaner units 4 into the separator tank without provision of pressure equipment.

In order to avoid the building up of an excessive pressure in either of the cleaners or the separator tank, an equalizing pipe 70 is shown as extending from the top of the separator tank to an equalizer manifold 71 connected by the valves 72 to the equalizer connection 73 on each of the units 4. The provision of this pipe equalizes the pressure in the base of the cleaner units and the separator so that there may be a free gravity flow into the separator tank.

The flow of materials from the separator tank may be suitably controlled by a float valve 75 which will control the water level and by a float valve 76 to control the gasoline or distillate level. These floats control the diaphragms 77 and 78 respectively on the valves 79 and 80 on the liquid and distillate outlet pipes 81 and 82 respectively.

The cleaner tubes 13 of the Fig. 3 may be of any suitable type of small centrifugal gas cleaner tube and the number of these tubes will be dependent upon the size of the shell 10 and upon the capacity which is intended to be handled by each unit. The number of units in turn will be controlled by the total volume of gas to be handled. As an illustration, each of the units 4 is actually handling 10,000,000 cubic feet of gas at a pressure of 2500 pounds per square inch and is effecting the separation of 600 barrels of distillate from such quantity of gas. Of course, the volume to be handled by each unit depends upon the internal resistance to flow of that unit and of course, such resistance varies with the volume to be forced through the unit.

The parts and equipment will be set up as seen in Fig. 1 and operated by opening the valve 6 to admit the incoming material to the cleaner units. The valve 32 controls the discharge of liquids and solids and the valve 72 in turn permits equalizing of the pressure.

A particular advantage of the construction is the removability and replaceability of the tube nest 9. To accomplish the opening of the unit, the gas outlet valves 32 will first be closed so as to kill the unit. The inlet valve 6 will next be closed to shut off any further inlet and then the discharge valve 34 will be closed. This arrangement, however, while closing the unit 4, traps any pressure in the unit. This pressure is, of course, the same as the separating pressure at which the incoming gas has been introduced. Before the unit can be opened, it is necessary and desirable to relieve this pressure. To this end, the safety valve 72 is preferably a three-way valve which may be used to either admit pressure to the unit or it may be opened to discharge from the upper portion 84 thereof into the atmosphere. This relieves any pressure within the unit 4 so that the unit may be opened without danger.

Before opening the unit, however, if there continues to be any escape of pressure from the outlet 84, it will be apparent to the operator that some one of the valves is leaking and a check may be made thereon. When the pressure inside of the shell 10 has been relieved, the elbow 30 and flange end 24 may be removed so that the tube nest 9 can then be readily removed. Valves of this type are well known.

By the use of the outside float controls 75 and 76, there are no large openings in the separator tank which is of material advantage because it reduces the difficulty of making connection.

In some cases, it may be desirable to weld or permanently fix the tube nest 9 in the shell and to weld the head directly on the shell omitting flanges 23 and 24.

In the modification illustrated in Fig. 8, the tube nest 9 having the tubes 40 therein are mounted between plates 41 and 42 with the inlet of material passing through the opening 43 in the end 44 of the tube nest. The packing 110, similar to packing 45 of Fig. 6, is arranged to form a seal between the tube nest and the shell or housing 47. The tube nest is confined between the end of the shell 47 and the connecting nipple 49. The removement of the nipple 49 permits replacement of the tube nest. It is to be noted that the nipple 49 is of somewhat different configuration than that illustrated in Fig. 6 and is secured in position on the shell 47 by means of the collar 90 which engages the annular upstanding portion 91 on the end of such housing and lugs 92 on the nipple 49. Bolts extending through the lugs 92 contact the ears 93 of the collar 90 to secure the nipple 49 and housing 47 together. Packing 94 arranged between the abutting ends 96 and 97 of the housing and nipple respectively, prevent the leakage of material therebetween.

Particular attention is directed to the arrangement of the upper plate 41 and lower plate 42. The form of the invention illustrated in Fig. 8 differs from that shown in Fig. 6 in that the upper plate 41 is inclined as indicated at 100 at an angle with respect to the plate 42. The larger cross sectional area of the tube nest as indicated at 101 and the smaller area of the tube nest as illustrated at 102 tend to proportion the gas load in the tubes in the nest. This balances the volume, or flow of gas, through the tube nest to prevent overloading of the tubes immediately adjacent opening 43. The cleaned gas moves upwardly into the passage 50 above the tube nest and out through the discharge opening 50', while the liquids and solids are discharged through the outlets 103 and 104 below the tube nest and barrier 42. It can thus be seen that the separation of this unit is similar to the separation of the unit illustrated in Fig. 6 and previously described, however, the provision of the inclined upper plate increases the efficiency of the unit and makes for over-all smoother separation.

The tube nest is positioned on the end of the shell or housing 47 by any suitable means and one form of such means is illustrated in Fig. 12 wherein an annular abutment 105 is provided on the inner periphery 106 of the shell. The inner end 108 of the tube nest is provided with a seal retaining means 109 adapted to engage the annular abutment 105. Seal means 110 prevent the leakage of material from the tube nest into the shell.

Fig. 13 illustrates another modification of the invention adapted to be used where the gaseous fluid contains a high percentage of the distillate and other foreign substances. In this form of the invention, the mixture is discharged into the inlet 112 arranged tangentially on the tank 113. This imparts motion to the mixture so as to separate the fluid distillate and foreign substances therefrom which settle into the bottom of the tank as indicated at 114.

The separated gaseous fluid passes upwardly to the tube nest 9 arranged at the top of the tank 113. The tube nest includes a plurality of the tubes 40 arranged between and connected to the upper and lower plates 115 and 116 respectively. The upper plate forms an upper enclosure 117 above the tube nest into which the tubes open to discharge the cleaned gas therefrom, while the lower plate forms the lower enclosure 118 below the tube nest to receive the foreign material separated from the gases, and discharges such foreign material down the drain pipe 119 to the bottom of the tank. This form of the invention is particularly adaptable for use on a gaseous fluid where such gaseous fluid contains a high percentage of distillate and foreign substances. In effect, it is a two-cycle operation to insure practically 100% cleaning and separation of the gases. The tube nest 9 may be permanently fixed, as by welding, in the tank 113, in which case the removable head and flanges therefor are omitted with the head being permanently fixed on the tank as shown in the drawings.

An alternate modification of the invention shown in Fig. 15 is particularly adaptable for use on oil wells where the quantity of gas is relatively low. The oil and gas mixture is passed through the tangential inlet 112 to the tank 113 to separate the bulk of the fluid therefrom whereupon the fluid settles to the bottom of the tank as indicated at 114. A discharge pipe 120 receives the gases separated from the oil or other liquid fluid in the tank 113 and passes it to the tube nest 9 arranged thereabove. The tube nest 9 includes the tubes 40 arranged between and connected to the upper plate 115 and lower plate 116. The top of the tubes open into the upper enclosure 117 formed by the upper plate and the surrounding housing 121, to discharge the cleaned and separated gases from the unit. The bottom of the tubes is connected into the lower enclosure 118 to discharge the separated foreign material therein, whereupon they are drained through pipe 119 to the bottom of tank 113. The fluid level within the tank 113 shown in each of Figs. 13 and 15 may be maintained at a predetermined level to insure efficient operation of the device and complete separation of the fluids from the gaseous medium.

Broadly the invention contemplates a means and method of cleaning gas and separating the foreign matter removed therefrom in a continuous operation where any of the cleaner units may be readily cut out for repair or replacement.

What is claimed is:

1. A separator to remove foreign matter from gas produced from wells comprising an inlet manifold, a bank of separator units connected thereto, each unit comprising a shell having a cylindrical body and a base merging therewith, a removable tube nest in each shell, means to seal each nest in the shell, a gas manifold connected to said bank of units, a liquid and foreign solid matter outlet from each unit, a liquid and solids gravity separator to receive and separate the liquid from the solid flow from said outlet, and means to equalize the pressure in said units and separator.

2. A separator to remove foreign matter from wells comprising an inlet manifold, a bank of separator units connected thereto, each unit comprising a shell having a cylindrical body and a base merging therewith, a removable tube nest in each shell, means to seal each nest in the shell, a gas manifold connected to said bank of units, a liquid and foreign solid matter outlet from each unit, a liquids and solids gravity separator to receive and separate the liquid from the solid flow from said outlet, and means to equalize the pressure in said separator to discharge tangentially thereinto below the liquid level so as to set up a centrifugal movement of liquid in such separator.

3. A gas cleaning system to separate solids and liquids having light and heavy fractions entrained in the gas comprising a series of cleaner units adapted for separation of the gas from the solids and liquids therein, each unit including a replaceable cleaner nest, means to admit the gas and liquid mixture to said nest, means to exit the separated gas from the nest, means to discharge the liquid and solid material from the nest, and a separator connected to said discharge means to separate the liquid material into light and heavy fractions.

4. A gas cleaning system to separate solids and liquids having light and heavy fractions entrained in the gas comprising a series of cleaner units adapted for separation of the gas from the solids and liquids therein, each unit including a replaceable cleaner nest, means to admit the gas and liquid mixture to said nest, means to exit the separated gas from the nest, and a separator connected to said discharge means to separate the liquid material into light and heavy fractions, and means whereby replacement of each of said nests may be effected independently.

5. A continuous gas cleaner unit for the separation of gas from foreign materials therein comprising a series of cleaner units each including a cleaner portion adapted to receive and separate a continuous flow of contaminated gas, outlet means on said cleaners for the foreign materials, a separator on said discharge line to separate the foreign material into its constituent parts, means connecting said series of cleaners to the top of said separator so as to maintain equal pressure in said units and said separator.

6. A continuous gas cleaner unit for the separation of gas from foreign materials therein comprising a series of cleaner units each including a cleaner portion adapted to receive and separate a continuous flow of contaminated gas, outlet means on said cleaners for the foreign materials, a separator on said discharge line to separate the foreign material into its constituent parts, means connecting said series of cleaners to the top of said separator so as to maintain equal pressure in said units and said separator, said series of cleaners being arranged so that replacement of any of said cleaner portions in said series may be effected while the remaining cleaner units are in operation.

7. A cleaner unit for gas comprising a shell having a cylindrical body and a base merging therewith, a support member on said shell, a removable tube nest affixed to said support member and extending longitudinally into said shell, means to admit the gas to said shell, means to admit the gas to said tube nest, a barrier adjacent the lower end of said tube nest, means adjacent the bottom of said barrier and on the periphery thereof forming a seal between said barrier and said shell, means to exit the cleaned gas, and means to discharge material removed from said gas.

8. A removable tube nest for a gas cleaner comprising a support plate, a plurality of cleaner tubes depending therefrom, means to admit gas tangentially of said tubes, a barrier enclosing said tubes below the said admission means, said tubes being open through said plate to exit the cleaned gas, said tubes being open below said barrier to discharge foreign material separated from the gas, and a seal member on the periphery of said barrier.

9. A gas cleaner, comprising, a horizontally disposed tubular casing, a nest of cleaner tubes removably insertible into the casing through one end thereof, said nest comprising spaced upper and lower plates extending generally longitudinally of said casing and respectively spaced from the upper and lower portions of said casing, end plates connected transversely across the opposite ends of said upper and lower plates and extending into peripheral sealing engagement with said casing, a gas discharge opening in one of said end plates above said upper plate, a gas inlet opening in the other end plate between said upper and lower plates, a plurality of vertically disposed gas cleaner tubes mounted between said upper and lower plates having their upper ends communicating with the space above said upper plate and having their lower ends communicating with the space below said lower plate, tangential openings in each of said tubes between said upper and lower plates, gas inlet means in one end of said casing communicating with said gas inlet opening, gas discharge means in the opposite end of said casing communicating with said gas discharge opening, and an opening in said casing communicating with the space below said lower plate for discharging from said casing foreign matter separated by said tubes from the entering gas.

10. A gas cleaner according to claim 9, wherein said upper plate is disposed at an angle to the longitudinal axis of said nest.

JAY A. ROSSITER.

References Cited in the file of this patent

UNITED STATES PATENTS

| Number | Name | Date |
| --- | --- | --- |
| 2,281,610 | Watson et al. | May 5, 1942 |
| 2,372,514 | Pootjes | Mar. 27, 1945 |
| 2,399,509 | Rich | Apr. 30, 1946 |
| 2,405,624 | Watson et al. | Aug. 13, 1946 |
| 2,422,563 | Pegg | June 17, 1947 |
| 2,433,774 | Madely | Dec. 30, 1947 |
| 2,498,832 | Watson | Feb. 28, 1950 |
| 2,511,387 | Watson | June 13, 1950 |